(12) United States Patent
Järvinen et al.

(10) Patent No.: US 11,740,991 B2
(45) Date of Patent: Aug. 29, 2023

(54) ASSIGNMENT OF TASKS BETWEEN A PLURALITY OF DEVICES

(71) Applicant: ABB Schweiz AG, Baden (CH)

(72) Inventors: Pekka Järvinen, Helsinki (FI); Mikko Kohvakka, Helsinki (FI); Teemu Tanila, Helsinki (FI)

(73) Assignee: ABB Schweiz AG, Baden (CH)

( * ) Notice: Subject to any disclaimer, the term of this patent is extended or adjusted under 35 U.S.C. 154(b) by 46 days.

(21) Appl. No.: 17/084,756

(22) Filed: Oct. 30, 2020

(65) Prior Publication Data

US 2021/0133074 A1 May 6, 2021

(30) Foreign Application Priority Data

Oct. 31, 2019 (EP) .................................... 19206550

(51) Int. Cl.
*G06F 11/34* (2006.01)
*G06F 8/61* (2018.01)
*G06F 9/48* (2006.01)
*G06F 9/50* (2006.01)
*G06F 11/30* (2006.01)

(52) U.S. Cl.
CPC ............ *G06F 11/3414* (2013.01); *G06F 8/61* (2013.01); *G06F 9/485* (2013.01); *G06F 9/5016* (2013.01); *G06F 11/3006* (2013.01); *G06F 11/3428* (2013.01)

(58) Field of Classification Search
None
See application file for complete search history.

(56) References Cited

U.S. PATENT DOCUMENTS

| 9,317,331 | B1 | 4/2016 | Koh et al. | |
|---|---|---|---|---|
| 2013/0254196 | A1* | 9/2013 | Babu | G06F 11/3419 707/736 |
| 2016/0033952 | A1* | 2/2016 | Schroeter | G05B 19/41885 700/108 |
| 2019/0041830 | A1* | 2/2019 | Yarvis | G06F 11/2033 |
| 2019/0109837 | A1* | 4/2019 | Louis | H04L 63/08 |

(Continued)

FOREIGN PATENT DOCUMENTS

WO  2016177405 A1  11/2016

OTHER PUBLICATIONS

U.S. Appl. No. 62/810,461, filed Feb. 26, 2019 (Year: 2019).*

(Continued)

*Primary Examiner* — June Sison
(74) *Attorney, Agent, or Firm* — Leydig, Voit & Mayer, Ltd.

(57) ABSTRACT

A method that includes defining a functionality of a system, wherein the system includes at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modifying the assignment of the tasks, distributing the application to the system, and receiving data regarding the execution of the application.

20 Claims, 5 Drawing Sheets

(56) References Cited

U.S. PATENT DOCUMENTS

2020/0099773 A1* 3/2020 Myers ............... H04L 67/34
2021/0260754 A1* 8/2021 Rodriguez ........... G05B 13/042

OTHER PUBLICATIONS

European Patent Office, Extended Search Report issued in corresponding Application No. 19206550.6, dated May 12, 2020, 7 pp.

* cited by examiner

ASSIGNMENT OF TASKS BETWEEN A PLURALITY OF DEVICES

TECHNICAL FIELD

The present application relates to distributed execution of an application.

BACKGROUND

An application may be executed by a plurality of devices comprised in a system. In some systems, the devices may be similar to each other while in some other systems the capabilities of the devices may vary greatly. Thus, execution of a distributed application may be smooth or it may be complicated due to the various capabilities of the devices comprised in the system.

BRIEF DESCRIPTION

According to an aspect there is provided a method comprising: defining a functionality of a system, wherein the system comprises at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modifying the assignment of the tasks, distributing the application to the system, and receiving data regarding the execution of the application.

According to an aspect there is provided a computer-implemented method comprising: defining a functionality of a system, wherein the system comprises at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modifying the assignment of the tasks, distributing the application to the system, and receiving data regarding the execution of the application.

According to an aspect there is provided an apparatus comprising means for defining a functionality of a system, wherein the system comprises at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modify the assignment of the tasks, distribute the application to the system, and receive data regarding the execution of the application.

According to an aspect there is provided an apparatus comprising at least one processor, and at least one memory including a computer program code, wherein the at least one memory and the computer program code are configured, with the at least one processor, to cause the apparatus to define a functionality of a system, wherein the system comprises at least a first device in a first device category and a second device in a second device category, define a configuration of the system, determine a plurality of tasks comprised in an application, wherein the application is to be executed by the system, simulating, use a simulation environment, execution of the application in the system when the tasks comprised in the application are assigned to be executed by the first device or the second device, based on the simulation, modifying the assignment of the tasks, distributing the application to the system, and receiving data regarding the execution of the application.

According to another aspect there is provided a system comprising means for defining a functionality of a system, wherein the system comprises at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modifying the assignment of the tasks, distributing the application to the system, and receiving data regarding the execution of the application.

According to an aspect there is provided a computer a computer program product which when executed by a computing apparatus causes the apparatus to perform defining a functionality of a system, wherein the system comprises at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modifying the assignment of the tasks, distributing the application to the system, and receiving data regarding the execution of the application.

According to another aspect there is provided a computer program product comprising computer program code stored in a non-transitory memory medium, the computer program code being configured to cause an apparatus, when executing the program code by a processor circuitry, to perform at least the following: defining a functionality of a system, wherein the system comprises at least a first device in a first device category and a second device in a second device category, defining a configuration of the system, determining a plurality of tasks comprised in an application, wherein the application is to be executed by the system, simulating, using a simulation environment, execution of the application in the system when the tasks comprised in the application are assigned to be executed by the first device or the second device, based on the simulation, modifying the assignment of the tasks, distributing the application to the system, and receiving data regarding the execution of the application.

DETAILED DESCRIPTION OF THE INVENTION

Figure 1:
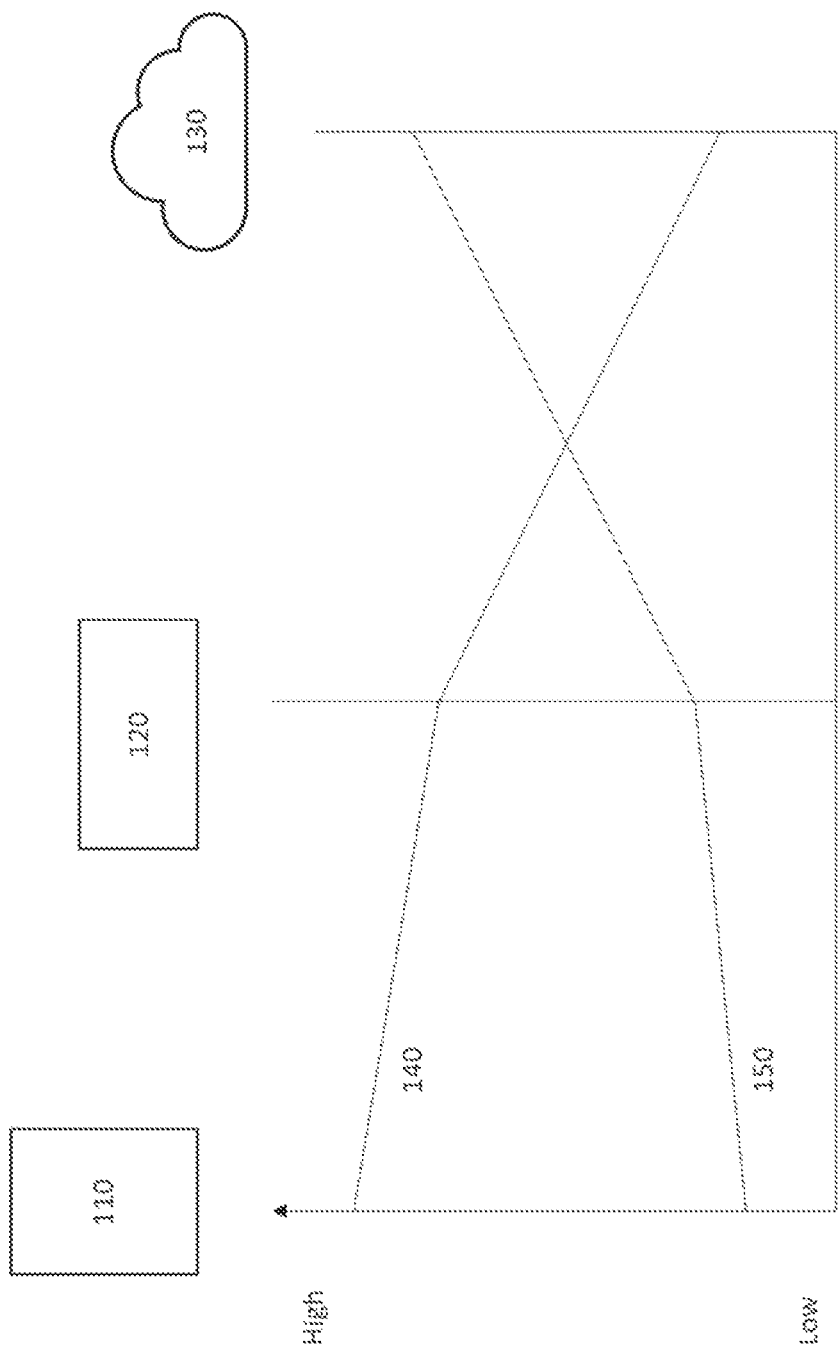
FIGS. 1 and 2 illustrate exemplary embodiments of a system.

The following embodiments are exemplifying. Although the specification may refer to "an", "one", or "some"

embodiment(s) in several locations of the text, this does not necessarily mean that each reference is made to the same embodiment(s), or that a particular feature only applies to a single embodiment. Single features of different embodiments may also be combined to provide other embodiments.

Internet of Things, IoT, may be understood in a broad sense as comprising all things connected to the Internet. In another example, IoT may be defined as a system of interrelated computing devices, mechanical and digital machines, objects, animals or people that are provided with unique identifiers (UIDs) and the ability to transfer data over a network without requiring human-to-human or human-to-computer interaction. Some applications for IoT focus on industrial environments and use cases and may also be called as Industrial IoT, IIoT. In some exemplary embodiments of IIoT, devices comprised in the IIoT may acquire and analyze data from connected equipment, such as connected devices, operational technology, locations and/or people. In such exemplary embodiments, IIoT may have the benefit of enabling better regulation and/or monitoring of one or more industrial systems. In some further exemplary embodiments, monitoring and analysing may be targeted for one or more of the following: industrial automation devices, electrical motors, mechanical parts such as gear boxes, conveyer belts and turn tables. Additionally, or alternatively, the following may also be monitored and analysed: operation environment of the industrial environment, one or more applications that are to be executed by a system comprised in the industrial environment, and/or users having access to the industrial system may affect the behaviour and/or usage of the industrial system.

In some exemplary embodiments, IoT may enable integration, that may be seamless, of various manufacturing devices, which may in some exemplary embodiments be automation devices, that are configured to perform sensing, identification, processing, communication, actuation and to connect to one or more networks. This may be beneficial for example in a manufacturing environment as manufacturing equipment, asset and situation management, and/or controlling a manufacturing process may be controlled and managed using a network to which all devices are connected to. In some other exemplary embodiments, IoT enables networking of machinery, sensors and/or control systems, which may further enable real-time optimization of manufacturing production and/or supply chain networks. In some exemplary embodiments, IoT may enable enhancements to asset management by allowing predictive maintenance and/or statistical evaluation.

In some exemplary embodiments, an IoT system comprises a plurality of devices that collect, send and act on data that is received from an environment surrounding the devices comprised in the IoT system. Additionally, the devices may communicate amongst themselves and act based on information received from the other, one or more, devices without human interaction or intervention. Yet, in some other exemplary embodiments, human interaction and/or intervention may be enabled.

In some exemplary embodiments of IoT systems, a layered modular architecture may be utilized. For example, physical machines such as sensors, devices and/or other physical entities connected to the IoT system, may be comprised in a first layer such as a device layer. A second layer, such as a network layer, may comprise physical network buses, cloud computing and/or communication protocols that aggregate and transport data to a third layer, such as a service layer. The service layer may execute functions that manipulate data received from the devices connected to the IoT system. For example, the service layer may provide data that is to be displayed on a dashboard thereby providing information to a user.

In some exemplary embodiments, the IoT system may comprise a plurality of devices that gather and share sensor data and are connected to an IoT gateway device, which is then further connected to cloud computing. An IoT gateway device may be understood as a physical device and/or software program product that enables a connection between the cloud computing and the devices comprised in the IoT system such as those gathering and sharing the sensor information or other devices connected to the IoT system and to the IoT gateway. Having an IoT gateway may be beneficial as there may be tens of thousands of data points per second generated by some sensors connected to the IoT system. The IoT gateway may therefore pre-process the data before it is transmitted to the cloud computing for further processing. The IoT gateway may further provide added security to the IoT system by protecting data it relays between the devices and the cloud computing.

In an IoT system, connections between devices as well as the connection to cloud computing may be wired, such as Ethernet, or wireless, such as Bluetooth, Wi-Fi or cellular communication network such as 4G or 5G. An IoT system may also require scalability, that may be huge, in the network space to handle for example surges of devices. 5G is envisaged to fulfil at least some of the requirements imposed by IoT. 5G, as well as 4G, enables using multiple input-multiple output (MIMO) antennas. 5G further enables utilizing more base stations than the 4G. In 5G macro sites may operate in co-operation with smaller stations and employing a variety of radio technologies. 5G is expected to have multiple radio interfaces, namely below 6 GHz, cmWave and mmWave, and also being integratable with existing legacy radio access technologies, such as the LTE. Further, 5G may enable one or more wireless control networks which enable a local, such as a factory specific, private network and low latency communication that supports one or more wireless control loops and/or one or more wireless program logic controllers enabling control from an edge gateway and/or cloud computing.

Low latency applications and services in 5G may require content to be brought close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time.

Use cases related to 5G may be classified to three different categories: Enhanced, Mobile Broadband, eMBB, Massive Machine Type Communications, mMTC and Ultra-reliable and Low-latency Communications, URLLC. Of these use cases, URLLC is targeted to enable delay-sensitive service use cases such as autonomous driving, remote control, factory automation and vehicle-to-vehicle communication. URLLC is to support low-latency transmissions of small payloads while having high reliability requirements. Yet, in 5G, all three categories, coexist within the same radio access network, RAN, architecture.

In an industrial environment, there may be several automation devices in a limited physical space such as a room or a hall. These automation devices may then further be connected to one or more edge gateways such as an IoT gateway and thereby further connected to cloud computing. An edge gateway may be considered as an apparatus that enables pre-processing of data locally before transmitting it to cloud computing and/or vice versa. The data may be for example data received from sensors and/or automation devices or it may be data received from the cloud. The automation devices may comprise one or more sensors that may provide data such as sensing data. The automation devices may also have processing capabilities and may therefore be configured to perform one or more tasks.

In some exemplary embodiments, an edge gateway such as an IoT gateway, may be located at the factory site. The edge gateway may be configured to process data by executing some functions of cloud computing. This may be beneficial as it may reduce the amount of data exchanged between the factory site and cloud computing, and, in some exemplary embodiments, utilize the lower latency between the edge gateway and automation devices and sensors located at the factory site to which the edge gateway is connected to. In some exemplary embodiments, a wired, for example Ethernet based, network with a plurality of automation devices, one or more gateways may form a hierarchical tree type of a network. This may be beneficial for example if the automation devices are connected in a daisy chain or ring topology having integrated Ethernet switches such that each device and/or switch causes latency, which may limit the size of each daisy chain or ring networks. FIG. 1 illustrates an exemplary embodiment of a system, which may be an IoT system. In that system there is at least one automation device 110, at least one edge gateway 120, which may be an IoT gateway, and which is connected to cloud computing 130. The automation device 110 may be considered to belong to a first device category and the edge gateway may be considered to belong to a second device category. Additionally, cloud computing 130 may be considered as a third category. In some other exemplary embodiments, there may also be further device categories. The device categories may be determined based on performance capabilities of the devices comprised in the system. For example, the automation device 110 may have the fastest real-time domain, for example, microsecond level domain. Yet, the processing capabilities may be lower than in the other device categories. This may be due to various reasons. For example, the processing capability as such may be lower or there may be more processing capabilities but not all of those are available for utilization as they are assigned to execution of one or more other functions of the device. Thus, the first device category may be determined to correspond to the characteristics of the automation device 110.

The edge gateway 120 may have the second best performance in real-time domain, for example, millisecond level domain. The processing capability of the edge gateway 120 is however greater than that of the automation device 110. This may be because the is more processing capability as such available or because the processing capability available for utilization is greater. For example, an automation device may have resourcing, i.e processing capability, tied to functions it is assigned to perform and the edge gateway on the other hand does not have such functions assigned to it and thereby its processing capability is not assigned to such functions. Therefore, the second device category may be determined to correspond to that of the edge gateway 120. Additionally, there may be the third device category corresponding to cloud computing 130. The processing capability in this device category is the greatest, but the real-time performance is the lowest of the device categories. It is to be noted that also other criteria may be used to determine device categories.

The differences between the performance capabilities of the automation device 110, edge gateway 120 and cloud computing 130 are illustrated in the graph of FIG. 1. The graph 140 illustrates the differences in terms on real-time performance and the graph 150 illustrates the differences in terms of processing capability. The differences in real-time capabilities are, at least partly, due to the latency and jitter caused by network. To better serve the needs of systems such as the system of the exemplary embodiment 1, for example the low latency requirements of 5G have been introduced.

In a system such as the system introduced in FIG. 1, an application may be executed to, for example, monitor the system for purposes such as diagnostics, fleet management, analytics and/or predictive maintenance. The application may comprise tasks that are to be executed and the application may be executed in a distributed manner in which the tasks comprised in the application may be executed by different devices of the system. Thus, the application may also be called as a distributed application. In other words, some of the tasks comprised in the application may be executed by one or more devices in the first device category and some other tasks comprised in the application may be executed by one or more devices in the second device category. Additionally, some further tasks comprised in the application may be executed by the third device category. A task may comprise computer readable instructions that are to be executed by a computing apparatus.

As the capabilities of the devices in the different device categories vary, it may be beneficial to take those capabilities into account when determining which tasks comprised in the application to assign to which device and/or device category for execution.

Figure 2:
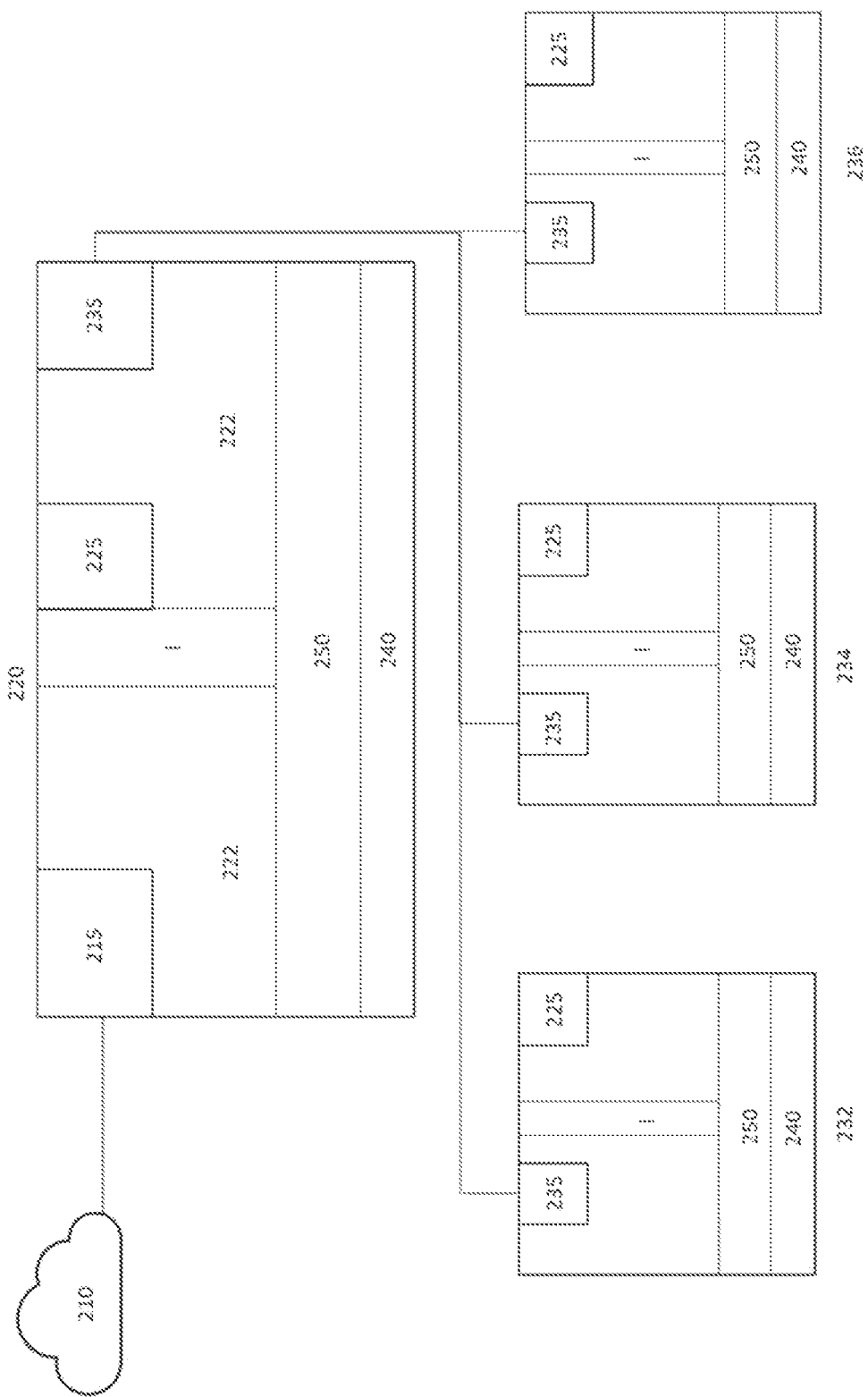

FIG. 2 illustrates another exemplary embodiment of a system such as an IoT system. The system comprises a connection 215 to the cloud 210, and an edge gateway 220. Three automation devices 232, 234 and 236 are connected to the gateway. It is to be noted that in some other exemplary embodiments there may be a plurality of edge gateways and another amount of automation devices. The connection between the automation devices 232, 234 and 236 and the edge gateway 220 may be wired or wireless. In this exemplary embodiment the connection is a local Ethernet connection 235. The local Ethernet connection 235 may have multiple ports and switches, which enables different topologies such as star, daisy-chain or ring topologies. In this exemplary embodiment, any suitable topology may be used.

The automation devices 232, 234 and 236 belong to a first device category, the gateway to a second device category and the cloud computing 210 to a third device category. The edge gateway 220 and the automation device 232, 234 and 236 comprise an isolated memory space area 225. The isolated memory space area may be called as a sandbox area. The isolated memory space area 225 may have an interface to an application programming interface, API.

The gateway may further comprise an operating system 222 such as Linux. The isolated memory space of the gateway 220 may therefore be comprised in the operating system and may enable an environment for executing high level tasks comprised in an application to be executed by the system. High-level may be understood as referring to tasks that are focused on the overall goals and systemic features on a macro level of the system. High-level tasks may require input from low-level tasks of the tasks comprised in the application to be executed by the system. Such low-level tasks may be executed by the automation devices 232, 234 and 236. Low-level may be understood as tasks focusing on individual components such as sensors, and other micro-level features of the system. Low-level tasks may comprise microprocessor commands for example. Additionally, or alternatively, low-level tasks may comprise measuring for example real-time waveforms, gradients of currents, voltages, temperatures, audio levels and/or acceleration. Further, additionally or alternatively, low-level tasks may comprise monitoring for example how many times one or more events occur, performing frequency spectrum analysis such as fast Fourier transformation, FFT, or analysing input from one or more sensors. The low-level tasks may be executed using the isolated memory area 225 of an automation device such as automation device 232, 234 or 236. In the automation devices of this exemplary embodiment, the isolated memory space 225 has an interface with one or more real-time control loops. In this exemplary embodiment, the tasks comprised in the application that is to be executed by the system are divided such that tasks that are computationally demanding with less real-time requirements are executed by the gateway and tasks that are computationally less demanding but have stricter real-time requirements are executed by one or more of the automation devices 232, 234 and 236.

In this exemplary embodiment, the gateway 220 and the automation devices 232, 234 and 236 further comprise isolation areas I, one or more processing cores 240 and a hypervisor 250 enabling running of one or more virtual machines.

In an industrial environment, there may be great variations in the systems such as IoT systems. For example, the automation devices may be directed towards different functionalities and therefore the number of automation devices comprised in the systems as well as performance characteristics and capabilities of the automation devices comprised in the system may vary greatly. Thus, when developing an application that is to be executed by such a system, which is now a target system, there may be a need to consider the system individually as there may be few or hardly any other systems similar to the system. In order for the application to be executed as efficiently as possible by the system, it would be beneficial to split the execution such that at least some of the tasks comprised in the application are performed by a device that is most suitable for each task. In some exemplary embodiments, this may be achieved for example by defining device categories and allocating tasks comprised in the application to a device category and then to a device in that device category.

In order to be able to develop the application such that the tasks comprised in it are executed by the most suitable device of the system, a tool may be provided. The tool may be a development tool such as a block programming tool or a model-based design tool. The tool may be accessible in a suitable computing device and the computing device may or may not be part of the system. In the tool, the system, which may be an IoT system and/or a system such as illustrated in FIGS. 1 and 2, for which an application is to be developed, may be defined, at least partly, by defining functionality of the system in terms of inputs received, outputs provided and/or performance specifications such as sample rates, resolutions, accuracy, latency and/or data rate requirements.

In addition to system functionality, the configuration of the system may also be defined using the tool. This may be done for example by defining for devices comprised in the system and/or for device categories comprised in the system capabilities such as processing capability, and/or real-time level domain. The capabilities may be entered manually by a user, those may be downloaded, pre-installed or provided in any other suitable manner. The system functionality may further define the type of connection there is between various devices comprised in the system.

The tool may comprise or be connected to a simulation environment that may then, based on the defined system and its functionality, simulate performance of the system for a given task or a set of tasks that are to be comprised in the application that is being developed and is to be executed in a distributed manner by the system. The simulation environment may be provided by the manufacturer of the automation devices, for example, and may be implemented using any suitable manner of implementing a simulation environment. The use of the simulation environment may enable simulating how the application to be developed would be executed by the system and thereby detecting possible performance bottle-necks of the system in terms of executing the tasks comprised in the application. The performance and performance bottle-necks may vary depending on how the tasks comprised in the application are assigned to the various devices and/or device categories comprised in the system. Being able to simulate possible performance bottle-necks may enable an efficient assignment of the tasks, comprised in the application to be executed by the system, to the devices and/or device categories. For example, there may be a threshold determined in terms of execution time below which the execution of a task should be completed by a device. Further, in some exemplary embodiments, capacity of memory may also be determined as a characteristic that should be above a threshold value in order to determine that the device is suitable for executing a task. Based on the simulation, the assignment of the tasks may be modified. For example, if, based on the simulation, it is determined that a task would not be executed by the device it is assigned to within the execution time expected, the assignment of the task may be modified such that it is assigned to another device or device category. Modifying the assignment of the task may be performed automatically by the tool form example or the tool may provide a suggestion of how to modify the allocation and user input may be received to confirm the modification.

The simulation results may be used to determine how to assign the tasks to the devices and/or device categories of the system. Additionally, or alternatively, the tool may be configured to use pre-defined rules as a basis for assigning the tasks. Further additionally or alternatively, user input may be received and used by the tool to determine the assigning of the tasks. In some exemplary embodiments, artificial intelligence, AI, may further be utilized by the tool to determine the assigning of the tasks comprised in the application. AI may be understood as simulation of human intelligence processes by one or more connected computing devices. The processes may be understood to comprise learning such as the acquisition of information and rules for using the information, reasoning such as using rules to reach approximate or definite conclusions and self-correction. One form of AI is machine learning in which computing power is used to recognize patterns. Machine learning may comprise one or more algorithms that, based on given example inputs and their desired outputs, learn to recognize patterns and predict outcomes without explicitly being instructed on how to improve on predicting the outcome. Such machine learning may be based on statistical analysis, function approximation and/or mathematical optimization methods. An advantage of machine learning is that it enables quick and automatic production of models capable of analysing vast amounts of complex data and deliver accurate results quickly, a process which would be difficult if not even impossible for a human to undertake.

Once the application has been defined and/or developed and the allocation of the tasks comprised in the application has been determined, an application installation package may be generated. This may be done automatically. There may be one installation package that comprises a plurality of other application installation packages or there may be only one installation package. The application installation package may then be provided for downloading for example. The application installation package may then be downloaded to the system. This may be done for example by an edge gateway comprised in the system that is connected to the cloud and downloads the application installation package. The downloading may be initiated by a user or it may be automatic. For example, the edge gateway may check if there is an application installation package available for downloading or it may receive an indication that there is an application installation package available and as a response download the application installation package. It is to be noted that delivering the application to the system may be achieved in other suitable manners in some alternative exemplary embodiments.

After the application has been installed to the system, the system may execute the application in a distributed manner in which the tasks comprised in the application are executed by the devices, of the system, to which they have been assigned to. During the execution, data may be gathered regarding the execution of the application. For example, data regarding processing time of one or more tasks may be gathered. This information may then be provided as input to the simulation environment comprised in or connected to the tool that was used to develop the application. The simulation environment may then use the data to analyse the performance and to evaluate how accurate the simulation used was. The simulation may also use the data provided to improve the simulation model. This may be done for example by using machine learning. For example, the data regarding the execution may be used as training data when re-training the machine learning model used. In some exemplary embodiments, the simulation model may further automatically update the simulation model based on, at least partly, the input received. Further, in some exemplary embodiment, the updated simulation model may lead to a generation of another assigning of the tasks comprised in the application to the devices and/or device categories of the system. This update may then be delivered to the system by for example creating another application installation package.

Figure 3:
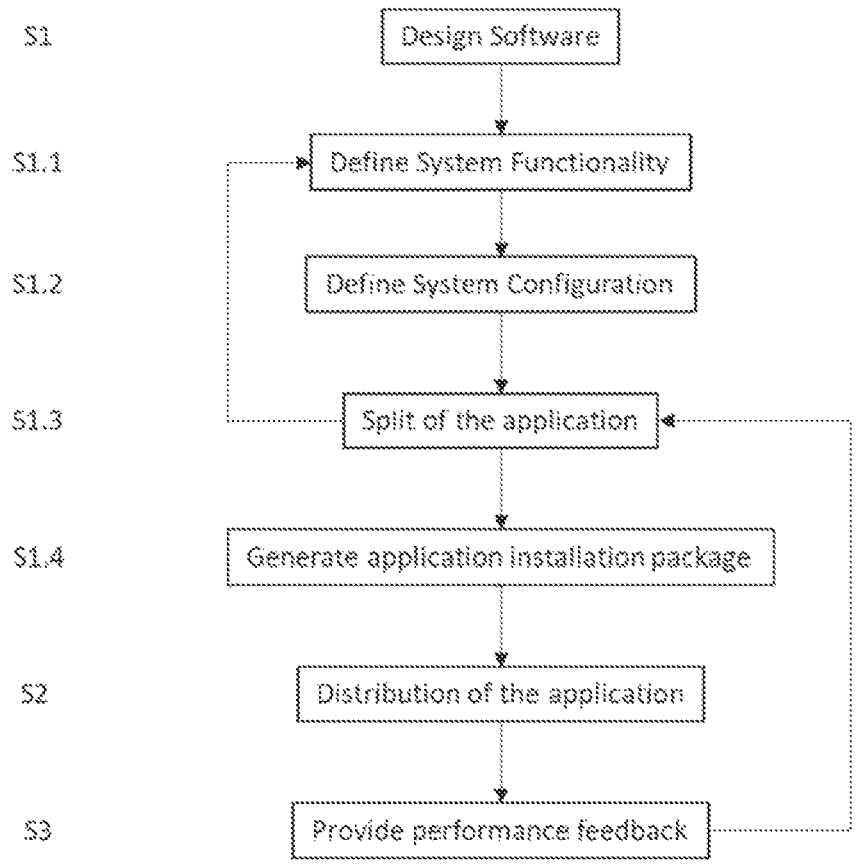
FIGS. 3 and 4 illustrate exemplary embodiments of flow charts.

FIG. 3 illustrates a flow chart of an exemplary embodiment of development of an application that is to be executed by system, which may be an IoT system, such as the system illustrated in FIG. 1 or FIG. 2. In S1 a tool such as described above, is used to develop the application. It is to be noted that the tool may be available on one of the devices comprised in the system or it may be available outside of the system. In S1.1 functionality of the system is defined. This may be done for example in a manner described above. In S1.2 the system configuration is defined. This may be done for example in a manner described above. After that, in S1.3 it is determined how the application is split, in other words, which device of the system is to be executed which task comprised in the application. This may be done as described above for example. Next, in S1.4 an application installation package is generated. This may be done as described above for example.

In S2 the application installation package is distributed to the system. This may be done for example as described above. In S3 performance feedback regarding the execution of the application is gathered and provided back to the tool. This may be done for example as described above.

Figure 4:
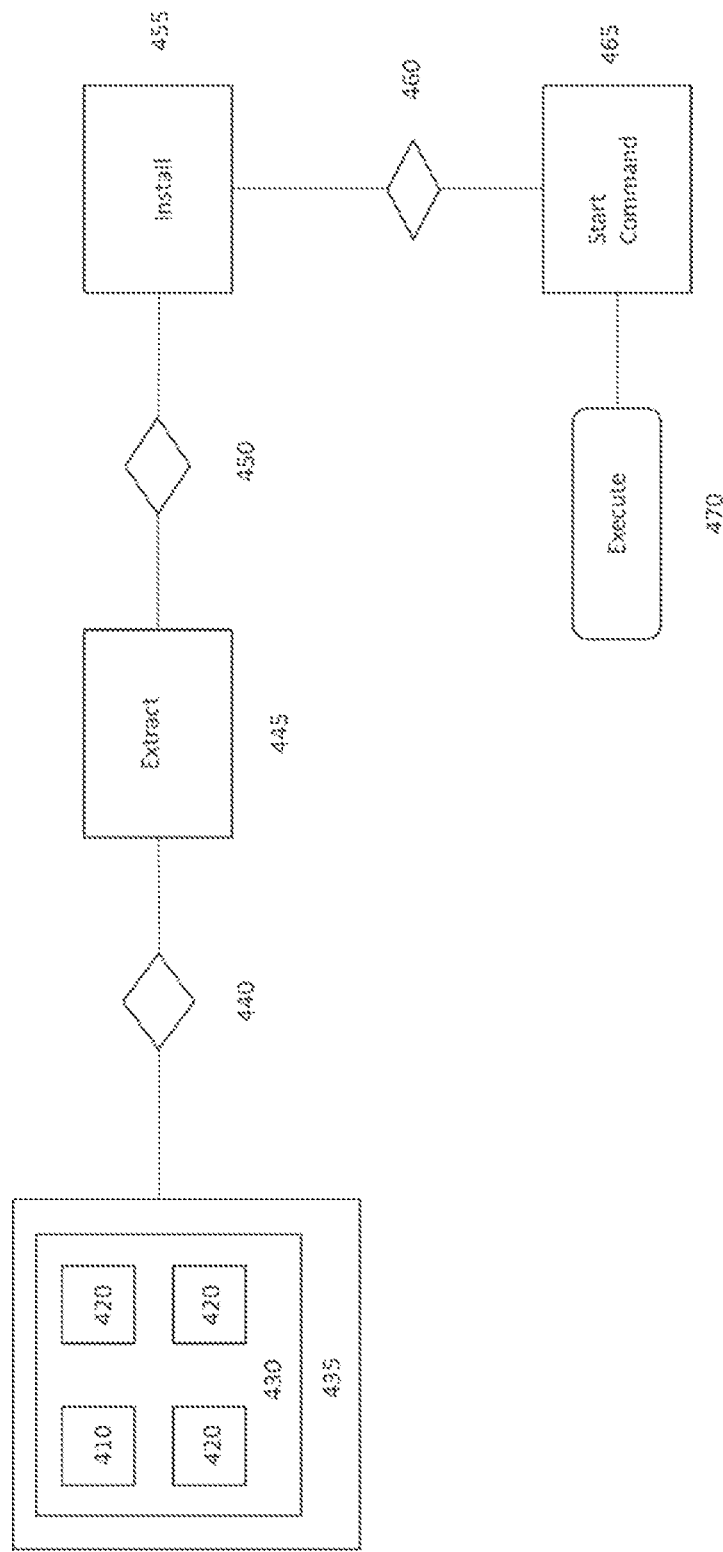

Distribution of the application installation package may be done by distributing it to the edge gateway as was described above. FIG. 4 illustrates an exemplary embodiment of distributing the application installation package. It is to be noted that although an exemplary embodiment is now described, there may also be other ways to distribute the application installation package. It is also to be noted that distribution may also be understood as providing an application installation package.

In this exemplary embodiment, an edge gateway 410 downloads a plurality of application installation packages each targeted to a certain device, such as an automation device, comprised in the system. The plurality of application installation packages therefore comprises an application installation package targeted to the edge gateway 410 as well as one or more application installation packages targeted to one or more automation devices 420. In this exemplary embodiment, there is one application installation package for the edge gateway 410 and three application installation packages for three automation devices 420.

The plurality of application installation packages 430 are comprised in a secure envelope 435 in an encrypted format and the secure envelope is then downloaded by the edge gateway 410. The edge gateway 410 may then authenticate 440 the secure envelope 435 and extract 445 the plurality of application installation packages 430 from the secure envelope 435. If the authentication fails, it may be determined that the cyber security is not to be trusted. Further, it may be determined that the application is not to be installed.

The gateway 410 may further verify 450 the authentication of the plurality of application installation packages 430 by using checksums for example. It is to be noted that in some alternative exemplary embodiments other suitable verification may be used. In case the verification is not successful, it may be determined that there is a fault in the integrity of the application. It may further be determined that the application, or some parts of it comprised in one of the plurality of application installation packages 430 are not to be installed. However, if the verification is successful the application may be installed 455 by installing the application installation packages to the devices they are assigned to. It is to be noted that in some exemplary embodiments the installation may not be successful. This may prevent execution of the application. Provided that the installation is successful 460, the execution of the application may be initiated by providing a start command 465. The execution 470 of the application comprises each device of the system to execute the tasks, comprised in the application, assigned to it thereby allowing distribution execution of the application by the system.

The exemplary embodiments described above may comprise benefits such as enabling customer specific application programming for a system that may comprise one or more automation devices. Such a system may also be called as an automation system. Additionally, or alternatively, the tasks comprised in the application may be automatically split for execution between the devices comprised in the system. The split may be done based on the processing and/or real-time performance characteristics of the devices comprised in the system. Additionally, or alternatively, the execution of the application by the system may be simulated before the application is provided for execution to the system and, additionally or alternatively, the split of the application may be refined by the simulation based on performance feedback received.

Figure 5:
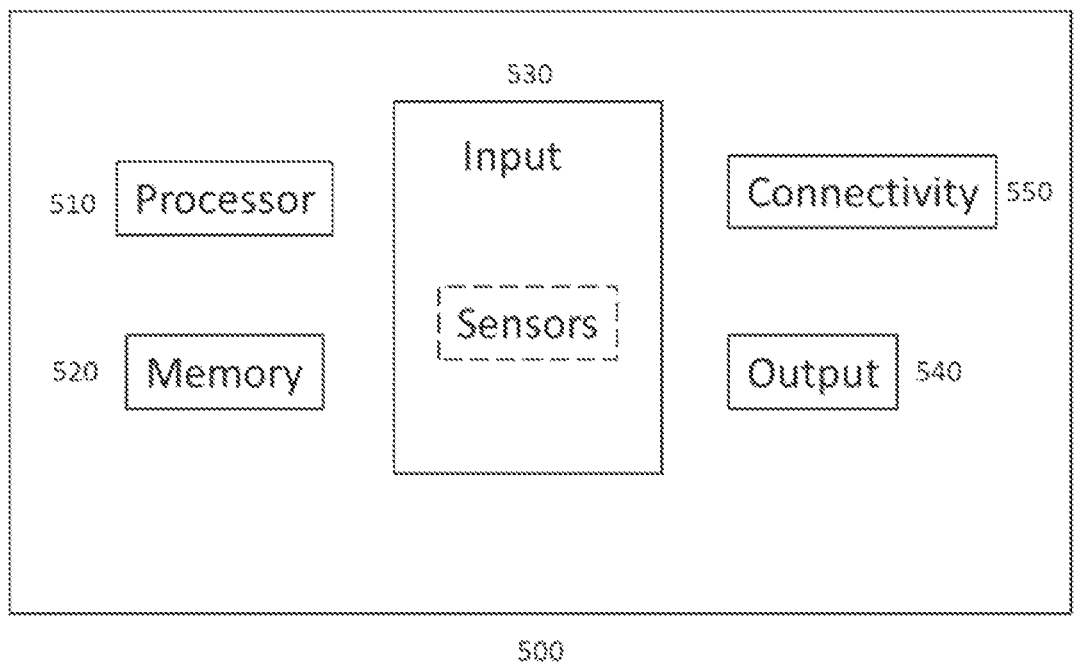
FIG. 5 illustrates an exemplary embodiment of an apparatus.

FIG. 5 illustrates an exemplary embodiment of an apparatus 500 which may be a device comprised in a system such as an automation system which may also be an IoT system. The apparatus 500 may additionally or alternatively, be an apparatus comprised in a device such as an automation device used in an industrial environment or a gateway device. The apparatus 500 may further, in some exemplary embodiments, be a computing apparatus. The units illustrated in FIG. 5 are logical units illustrating the functionalities of the apparatus 500 and the implementation of the functionalities may vary in different embodiments.

The apparatus 500 comprises a processor 510. The processor 510 interprets computer program instructions and processes data. The processor 510 may comprise one or more programmable processors. The processor 510 may comprise programmable hardware with embedded firmware and may, alternatively or additionally, comprise one or more application specific integrated circuits, ASICs.

The processor 510 is coupled to a memory 520. The processor is configured to read and write data to and from the memory 520. The memory 520 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 520 further stores computer readable instructions that are execute by the processor 510. For example, non-volatile memory stores the computer readable instructions and the processor 510 executes the instructions using volatile memory for temporary storage of data and/or instructions. The memory may also save data such as values.

The computer readable instructions may have been pre-stored to the memory 520 or, alternatively or additionally, they may be received, by the apparatus, via electromagnetic carrier signal and/or may be copied from a physical entity such as computer program product. Execution of the computer readable instructions causes the apparatus 500 to perform various functionalities such as those described in example embodiments of this document.

In the context of this document, a memory or computer-readable media may be any non-transitory media or means that can contain, store, communicate, propagate or transport the instructions for use by or in connection with an instruction execution system, apparatus, or device, such as a computer.

The apparatus 500 may, in some exemplary embodiment, further comprise, or be connected to, an input unit 530. The input unit 530 comprises one or more interfaces for receiving input. The one or more interfaces may comprise for example sensors such as one or more motion and/or orientation sensors, one or more cameras, one or more accelerometers, one or more buttons and/or one or more touch detection units. Further, the input unit 530 may comprise an interface to which external devices may connect to.

The apparatus 500 may further comprise a connectivity unit 550. The connectivity unit 550 enables wired and/or wireless connectivity to external networks such as Bluetooth, Wi-Fi, Ethernet, 4G or 5G. The connectivity unit 550 may comprise one or more antennas and one or more receivers that may be integrated to the apparatus 500 or the apparatus 500 may be connected to. The connectivity unit 550 may comprise an integrated circuit or a set of integrated circuits that provide the wireless communication capability for the apparatus 500. Alternatively, the wireless connectivity may be a hardwired application specific integrated circuit, ASIC.

It is to be noted that the apparatus 500 may further comprise various components not illustrated in the FIG. 5. The various components may be hardware component and/ or software components or a combination thereof.

In some exemplary embodiments, as was mentioned above, the apparatus 500 may be, or may be comprised in an automation device. An automation device may be a device that is to be used in an industrial environment. The automation device may be one device, or it may comprise a plurality of devices that are connected and/or configured to function together and may therefore be considered as one automation device. An example of such an automation device is for example a heating, ventilation, and air-conditioning, HVAC, device. The automation device may function independent of user input or, alternatively or additionally, a user may guide the functioning of the automation device, at least partly, by providing user input that may be any suitable user input such as press of a button, touch input, gesture input, voice command and so on. The automation device that may be used in an industrial environment may, in some exemplary embodiment, comprise a great amount of settings that determine how the automation device functions. Further, each industrial environment may be different thereby requiring the settings to be customised for that environment in order for the automation device to function properly. Therefore, a use of a simulation model when developing an application to a system comprising one or more automation devices may be beneficial.

The invention claimed is:

1. An apparatus comprising at least one processor, and at least one memory including a computer program code, wherein the at least one memory and the computer program code are configured, with the at least one processor, to cause the apparatus to:

define a functionality of a system, wherein the system comprises at least a first device in a first device category and a second device in a second device category, and wherein device categories are determined based on performance capabilities of devices comprised in the system;

define a configuration of the system;

determine a plurality of tasks comprised in an application, wherein the application is to be executed by the system;

simulate, using a simulation environment, execution of the application in the system when the tasks comprised in the application are assigned to be executed by the first device or the second device;

based on the simulation, modify, based at least in part on a pre-defined rule, the assignment of the tasks, wherein the pre-defined rule comprises defining a first task category, that is applicable to the first device category, and a second task category, that is applicable to the second device category, such that tasks in the first task category are computationally more demanding than the tasks in the second task category and the tasks in the first task category have less real-time requirements than the tasks in the second task category;
distribute the application to the system; and
receive data regarding the execution of the application.

2. The apparatus according to claim 1, wherein the first device category corresponds to the performance capabilities of the first device and the second device category corresponds to the performance capabilities of the second device.

3. The apparatus according to claim 1, wherein the first device comprises an isolated memory space area configured to execute the tasks assigned to the first device.

4. The apparatus according to claim 1, wherein the second device comprises an isolated memory space area configured to execute the tasks assigned to the second device.

5. The apparatus according to claim 1, wherein distributing the application to the system further comprises generating an application installation package.

6. The apparatus according to claim 5, wherein the application installation package comprises a plurality of application installation packages.

7. The apparatus according to claim 1, wherein the apparatus is further caused to modify the simulation environment based on the received data regarding the execution of the application.

8. The apparatus according to claim 7, wherein modifying the simulation environment comprises utilizing artificial intelligence.

9. The apparatus according to claim 1, wherein the first device is an edge gateway.

10. The apparatus according to claim 1, wherein the second device is an automation device.

11. The apparatus according to claim 1, wherein distributing the application comprises distributing the application to the first device.

12. The apparatus according to claim 1, wherein the system further comprises a third device category.

13. The apparatus according to claim 1, wherein the system is an Internet of things system further comprising a connection to cloud computing.

14. A method comprising:
defining a functionality of a system, wherein the system comprises at least a first device in a first device category and a second device in a second device category, and wherein device categories are determined based on performance capabilities comprised in the system;
defining a configuration of the system;
determining a plurality of tasks comprised in an application, wherein the application is to be executed by the system;
simulating, using a simulation environment, execution of the application in the system when the tasks comprised in the application are assigned to be executed by the first device or the second device;
based on the simulation, modifying, based in part on a pre-defined rule, the assignment of the tasks, wherein the pre-defined rule comprises defining a first task category, that is applicable to the first device category, and a second task category, that is applicable to the second device category, such that tasks in the first task category are computationally more demanding than the tasks in the second task category and the tasks in the first task category have less real-time requirements than the tasks in the second task category;
distributing the application to the system; and
receiving data regarding the execution of the application.

15. The method according to claim 14, wherein the first device category corresponds to the performance capabilities of the first device and the second device category corresponds to the performance capabilities of the second device.

16. The method according to claim 14, wherein the first device comprises an isolated memory space area configured to execute the tasks assigned to the first device and the second device comprises an isolated memory space area configured to execute the tasks assigned to the second device.

17. The method according to claim 14, wherein distributing the application to the system further comprises generating an application installation package.

18. The method according to claim 14, further comprising modifying the simulation environment based on the received data regarding the execution of the application.

19. The method according to claim 18, wherein modifying the simulation environment comprises utilizing artificial intelligence.

20. A computer program product comprising computer program code stored in a non-transitory memory medium, the computer program code being configured to cause an apparatus, when executing the program code by a processor circuitry, to perform at least the following:
defining a functionality of a system, wherein the system comprises at least a first device in a first device category and a second device in a second device category, and wherein device categories are determined based on performance capabilities comprised in the system;
defining a configuration of the system;
determining a plurality of tasks comprised in an application, wherein the application is to be executed by the system;
simulating, using a simulation environment, execution of the application in the system when the tasks comprised in the application are assigned to be executed by the first device or the second device;
based on the simulation, modifying, based at least in part on a pre-defined rule, the assignment of the tasks, wherein the pre-defined rule comprises defining a first task category, that is applicable to the first device category, and a second task category, that is applicable to the second device category, such that tasks in the first task category are computationally more demanding than the tasks in the second task category and the tasks in the first task category have less real-time requirements than the tasks in the second task category;
distributing the application to the system; and
receiving data regarding the execution of the application.

* * * * *